(12) United States Patent  
Larosa et al.

(10) Patent No.: US 9,886,074 B2
(45) Date of Patent: Feb. 6, 2018

(54) ELECTRONIC DEVICE AND SENSOR DEVICE WITH LOW POWER CONSUMPTION AND RELATED METHODS

(71) Applicant: STMICROELECTRONICS S.R.L., Agrate Brianza (IT)

(72) Inventors: Roberto Larosa, Viagrande (IT); Daniele Mangano, San Gregorio di Catania (IT); Riccardo Condorelli, Tremestieri Etneo (IT); Giulio Zoppi, Palermo (IT); Natale Aiello, Trecastagni (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 38 days.

(21) Appl. No.: 14/943,472

(22) Filed: Nov. 17, 2015

(65) Prior Publication Data

US 2017/0139461 A1    May 18, 2017

(51) Int. Cl.
    *G06F 1/32*    (2006.01)
    *G06F 1/26*    (2006.01)

(52) U.S. Cl.
    CPC .............. *G06F 1/3206* (2013.01); *G06F 1/26* (2013.01)

(58) Field of Classification Search
    CPC ........................................................ G06F 1/32
    See application file for complete search history.

(56) References Cited

U.S. PATENT DOCUMENTS

| 4,675,770 A * | 6/1987 | Johansson | G05F 1/573 |
| | | | 361/103 |
| 4,918,995 A * | 4/1990 | Pearman | G01D 4/004 |
| | | | 73/204.11 |
| 7,460,025 B2 | 12/2008 | Mellert et al. | |
| 7,747,415 B1 * | 6/2010 | Churchill | F41A 17/06 |
| | | | 702/187 |
| 7,908,500 B2 | 3/2011 | Westwick et al. | |
| 8,160,654 B2 | 4/2012 | Onishi et al. | |
| 8,324,756 B2 | 12/2012 | Dash et al. | |
| 8,525,484 B2 | 9/2013 | Lee et al. | |
| 8,590,395 B2 | 11/2013 | Ge | |
| 8,723,492 B2 | 5/2014 | Korzeniowski | |
| 8,769,315 B1 * | 7/2014 | Ortiz | G06F 1/3206 |
| | | | 713/300 |
| 8,830,055 B2 * | 9/2014 | Lynch | B64C 25/00 |
| | | | 340/539.3 |
| 9,151,654 B2 * | 10/2015 | Stenson | G01F 15/063 |
| 9,318,015 B2 * | 4/2016 | Kates | G08B 25/10 |

(Continued)

OTHER PUBLICATIONS

Jim Williams, "Understanding and Applying the LT1005 Multifunction Regulator", Aug. 1984, Linear Technology, p. 2.*

(Continued)

*Primary Examiner* — Thomas Lee
*Assistant Examiner* — Gary Collins
(74) *Attorney, Agent, or Firm* — Slater Matsil, LLP

(57) ABSTRACT

An electronic device may include a transducer configured to generate an electrical output responsive to an input, and a data storage element configured to change state responsive to the transducer. The electronic device may include a power circuit configured to turn on and supply power responsive to the data storage element changing state, and a processing circuit configured to be powered by the power circuit.

26 Claims, 4 Drawing Sheets

(56) References Cited

U.S. PATENT DOCUMENTS

| | | | | |
|---|---|---|---|---|
| 2002/0161988 | A1* | 10/2002 | Barlow | G06F 1/3203 712/221 |
| 2004/0008188 | A1* | 1/2004 | Liu | G06F 1/3215 345/177 |
| 2004/0078662 | A1* | 4/2004 | Hamel | B60C 23/0411 714/22 |
| 2004/0134281 | A1* | 7/2004 | Pedrazzini | G06F 1/3203 73/652 |
| 2004/0155860 | A1* | 8/2004 | Wenstrand | G06F 1/3203 345/156 |
| 2005/0017602 | A1* | 1/2005 | Arms | B60C 23/0411 310/339 |
| 2005/0104853 | A1* | 5/2005 | Sitalasai | G06F 1/3203 345/163 |
| 2005/0275528 | A1* | 12/2005 | Kates | G08B 1/08 340/539.22 |
| 2006/0059977 | A1* | 3/2006 | Kates | G01M 3/2815 73/40 |
| 2006/0176175 | A1* | 8/2006 | Evans | C25C 3/20 340/539.22 |
| 2007/0079148 | A1* | 4/2007 | Pastorello | G06F 1/3203 713/300 |
| 2007/0247124 | A1 | 10/2007 | Mihashi | |
| 2007/0284293 | A1* | 12/2007 | Pitchford | G01D 4/004 210/85 |
| 2008/0177928 | A1* | 7/2008 | Suzuki | G11C 16/06 711/100 |
| 2008/0272836 | A1* | 11/2008 | Smit | G06F 1/3215 327/544 |
| 2009/0089599 | A1 | 4/2009 | Westwick et al. | |
| 2009/0224741 | A1 | 9/2009 | Marholev et al. | |
| 2010/0039234 | A1* | 2/2010 | Soliven | H04B 5/02 340/10.1 |
| 2010/0223476 | A1* | 9/2010 | Maletsky | H01M 10/4257 713/189 |
| 2010/0277304 | A1* | 11/2010 | Haartsen | H04W 52/0274 340/531 |
| 2011/0115335 | A1* | 5/2011 | Pelletier | G06F 1/3203 310/318 |
| 2011/0279096 | A1* | 11/2011 | Sonntag | H02J 7/34 320/166 |
| 2011/0315564 | A1 | 12/2011 | Guthrie et al. | |
| 2012/0025948 | A1* | 2/2012 | Lakamraju | E05B 47/00 340/5.6 |
| 2012/0032518 | A1* | 2/2012 | Huang | H02J 1/10 307/81 |
| 2012/0120695 | A1* | 5/2012 | Jauert | G03G 15/5004 363/100 |
| 2012/0223833 | A1* | 9/2012 | Thomas | G06F 19/3418 340/539.12 |
| 2013/0036796 | A1* | 2/2013 | Fleury, Jr. | G01M 3/00 73/40.5 R |
| 2013/0039230 | A1 | 2/2013 | Lee et al. | |
| 2013/0166932 | A1* | 6/2013 | Iarovici | G06F 1/3206 713/323 |
| 2013/0328416 | A1* | 12/2013 | Whitworth | H02J 50/30 307/149 |
| 2014/0281626 | A1* | 9/2014 | Younger | G06F 1/3203 713/323 |
| 2014/0335490 | A1* | 11/2014 | Baarman | A61B 5/002 434/236 |
| 2015/0042300 | A1* | 2/2015 | Peker | H02M 3/156 323/274 |

OTHER PUBLICATIONS

Condorelli et al., U.S. Appl. No. 14/739,195, filed Jun. 15, 2015.
Condorelli et al., U.S. Appl. No. 14/751,254, filed Jun. 26, 2015.

* cited by examiner

US 9,886,074 B2

ELECTRONIC DEVICE AND SENSOR DEVICE WITH LOW POWER CONSUMPTION AND RELATED METHODS

TECHNICAL FIELD

The present disclosure relates to the field of fluid flow sensors, and, more particularly, to fluid flow sensor circuitry and related methods.

BACKGROUND

Flow meters are used to measure the consumption of a metered fluid flow, such as the consumption of metered gas and water. In another application, flow meters may be installed along a fluid infrastructure, such as water lines, to detect leaks. Helpfully, these flow meters can prevent catastrophic damage from small leaks that go undetected for long periods.

With the advent of the Internet of Things, there is now a desire to couple flow meters to a network or to the Internet. So called "smart meters" are additionally able to communicate periodic readings of fluid flow over the network. Such readings must be accurate and transmission of consumption readings need only be performed periodically.

Since each smart flow meter is typically battery powered, power consumption may be an issue for some applications. In applications where a large number of smart flow meters are deployed, the need to maintenance each and every one regularly may not be desirable. Accordingly, the number of periodic readings and the frequency of the readings must be balanced with battery resources.

SUMMARY

Generally speaking, an electronic device may include a transducer configured to generate an electrical output responsive to an input, a data storage element configured to change state responsive to the transducer, and a power circuit configured to turn on and supply power responsive to the data storage element changing state. The electronic device may comprise a processing circuit configured to be powered by the power circuit. Advantageously, the electronic device may reduce power consumption (e.g. consuming only a leakage current or a negligible amount of power).

The transducer may be configured to generate the electrical output comprising an electrical pulse. The power circuit may be configured to turn on and supply power responsive to the electrical pulse. In some embodiments, the data storage element may comprise a flip flop configured to receive the electrical output and a reference voltage.

Additionally, the transducer may comprise a mechanical-to-electrical transducer. The transducer may also comprise an inductor-capacitor tank circuit. The transducer may comprise a mechanical-to-electrical sensor. The processing circuit may be coupled to an output of the mechanical-to-electrical sensor and may be configured to monitor the output when powered. Also, the electronic device may also include a wireless receiver coupled to the data storage element, and the wireless receiver may be configured to generate an electrical pulse based upon received radio frequency (RF) signals, and output the electrical pulse to the data storage element.

Another aspect is directed to a sensor device. The sensor device may include a fluid flow sensor configured to generate an electrical output responsive to a sensed fluid flow, a data storage element configured to change state responsive to the fluid flow sensor, and a voltage regulator configured to turn on and supply power responsive to the data storage element changing state. The sensor device may also comprise a processing circuit configured to be powered by the voltage regulator.

Yet another aspect is directed to an electronic device coupled to a transducer generating an electrical output responsive to an input. The electronic device may include a data storage element configured to change state responsive to the transducer, a power circuit configured to turn on and supply power responsive to the data storage element changing state, and a processing circuit configured to be powered by the power circuit.

Another aspect is directed to a method for operating an electronic device. The method may include operating a transducer to generate an electrical output responsive to an input, and operating a data storage element to change state responsive to the transducer. The method may comprise operating a power circuit to turn on and supply power responsive to the data storage element changing state, and operating a processing circuit to be powered by the power circuit.

DETAILED DESCRIPTION

Figure 1:
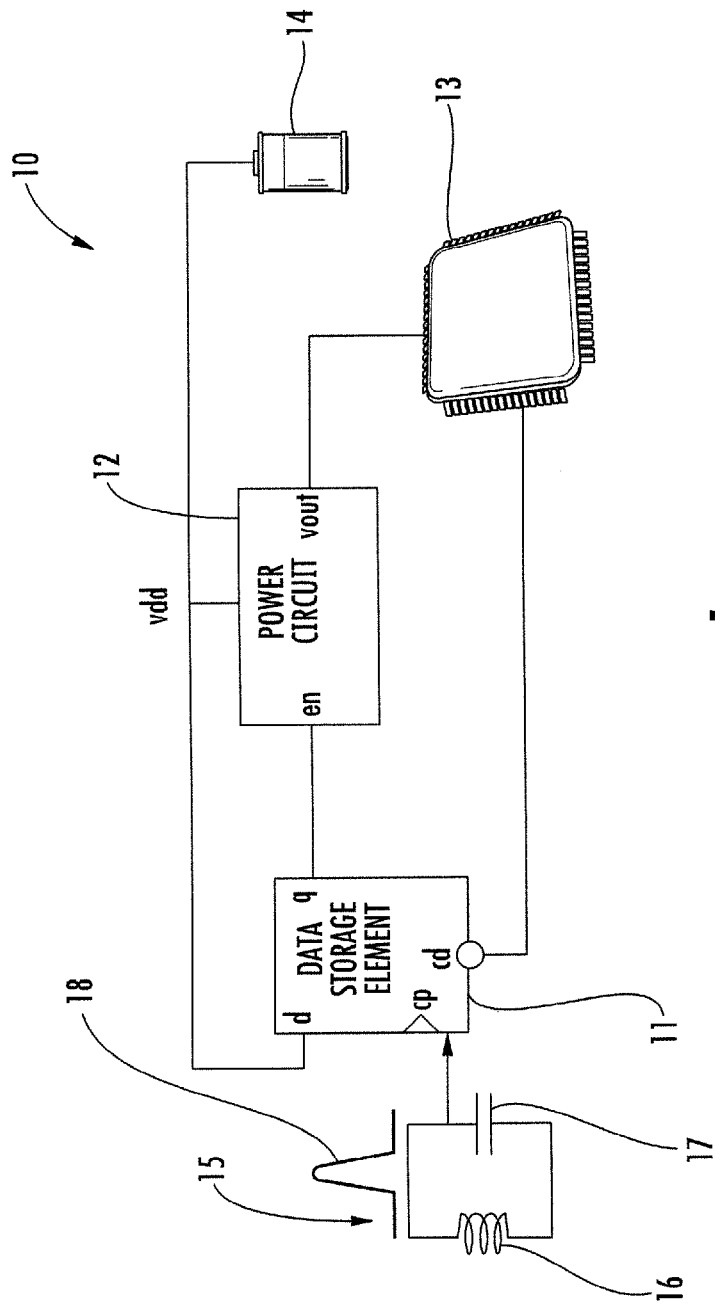
FIG. 1 is a schematic diagram of an electronic device, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIG. 1, an electronic device 10 according to the present disclosure is now described. The electronic device 10 illustratively includes a transducer 15 configured to generate an electrical output 18 responsive to an input. In the illustrated embodiment, the transducer 15 comprises comprise an inductor-capacitor tank circuit. In other embodiments, the transducer 15 may comprise other transducer types, such a piezoelectric transducer, an electroacoustic transducer, a thermoelectric transducer/generator, a mechanical-to-electrical transducer, a gyroscope transducer, or a mechanical-to-electrical transducer sensor.

As will be appreciated, the transducer 15 illustratively includes an inductor 16, and a capacitor 17 coupled to the inductor, defining an LC tank circuit oscillating at an operational frequency when actively powered. In this embodiment, the input is a varying electromagnetic field, which causes the electric output 18, for example, the illustrated electrical pulse. The electronic device 10 illustratively includes a battery power source 14. As discussed above, it may be desirable to conserve resources from the battery power source 14.

The electronic device 10 illustratively includes a data storage element 11 configured to change state responsive to the transducer 15. In the illustrated embodiment, the data storage element 11 comprises a flip flop configured to receive the electrical pulse 18 at a clock input and a reference voltage vdd at a data input d, the reference voltage being provided by the battery power source 14 (i.e. a constant high signal). The data storage element 11 may also comprise a latch circuit. The data storage element 11 illustratively includes a data output q.

The electronic device 10 illustratively includes a power circuit 12 configured to turn on and supply power responsive to the data storage element 11 changing state, and a processing circuit (e.g. a microcontroller unit (MCU)) 13. In some embodiments, the power circuit 12 may comprise a power switch circuit combined with the battery power source 14, or a voltage regulator (e.g. a low-dropout or LDO regulator).

The processing circuit 13 is coupled to a power output $v_{out}$ of the power circuit 12 and is configured to be powered by the power circuit. The power circuit 12 is configured to turn on and supply power responsive to the electrical pulse 18, which is received at an enable input en. In the illustrated example, the power circuit 12 is enabled when the enable input goes high. The processing circuit 13 is also coupled to the clear input (i.e. clear down) cd of the data storage element 11.

During a low power mode, the power circuit 12 and the data storage element 11 receive the reference voltage vdd from the battery power source 14. The data output q of the data storage element 11 is low, so the power circuit 12 is not enabled. In this mode, power consumption is limited to the leakage current in the data storage element 11 and the power circuit 12, which is desirably low (i.e. on the order of nanoamps). The electronic device 10 maintains the low power mode until the input is detected by the transducer 15.

When the transducer 15 receives the input, the transducer generates the electrical pulse 18 at the clock input of the data storage element 11. The electrical pulse 18 causes the data storage element 11 to trigger on the data input d, which is held high by the batter power source 14. This causes the data storage element 11 to change states and change the data output q from low to high, causing the power circuit 12 to be enabled. Once enabled, the power circuit 12 powers up the processing circuit 13, which places the electronic device 10 in an operational mode. The processing circuit 13 may cause the electronic device 10 to return to the low power mode by causing the clear input cd to go low, which resets the data output q to low, thereby disabling the power circuit 12.

In some embodiments, the processing circuit 13 may operate purely based upon the battery power source 14. In these embodiments, the power circuit 12 comprises a power switch, and when the data storage element 11 changes state, the power switch couples the battery power source 14 directly to the processing circuit 13.

Another aspect is directed to a method for operating an electronic device 10. The method may include operating a transducer 15 to generate an electrical output (i.e. a pulse) 18 responsive to an input, and operating a data storage element 11 to change state responsive to the transducer. The method may comprise operating a power circuit 12 to turn on and supply power responsive to the data storage element 11 changing state, and operating a processing circuit 13 to be powered by the power circuit.

Figure 2:
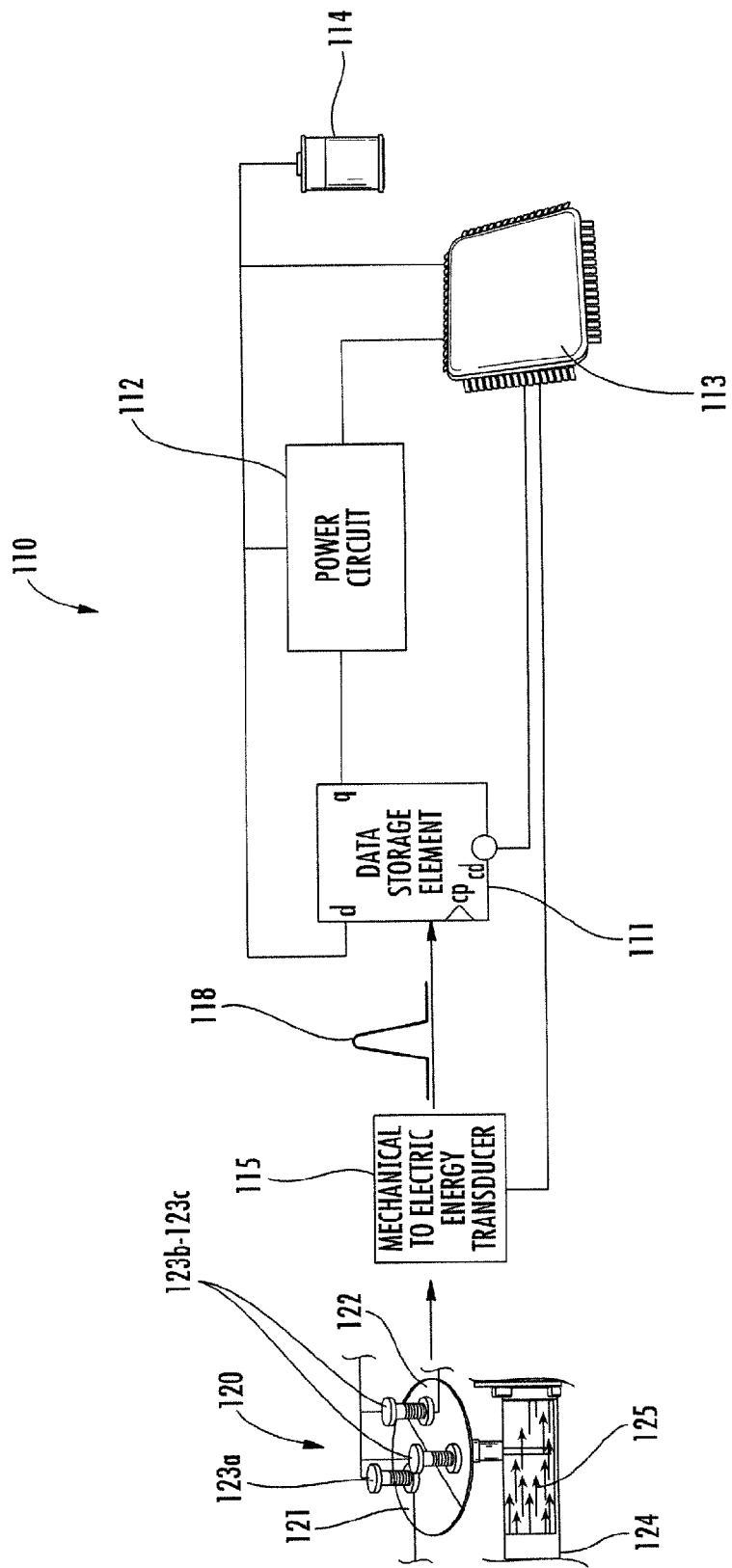
FIG. 2 is a schematic diagram of a sensor device, according to the present disclosure.

Referring now additionally to FIG. 2, another embodiment of the electronic device 110 is now described. In this embodiment of the electronic device 110, those elements already discussed above with respect to FIG. 1 are incremented by 100 and most require no further discussion herein. This embodiment differs from the previous embodiment in that this electronic device 110 illustratively is applied in a fluid flow sensor application, i.e. providing a sensor device. In this embodiment, the processing circuit 113 illustratively includes a direct coupling to the transducer 115.

In this embodiment, the input to the transducer 115 comprises a varying electromagnetic field, and the varying electromagnetic field is created by a fluid flow sensor 120. The fluid flow sensor 120 may comprise a sensor as disclosed in U.S. Pat. No. 8,590,395 to Ge, also assigned to the present application's assignee, the entire contents of which are hereby incorporated by reference. In this embodiment, the processing circuit 113 is configured to monitor the fluid flow sensor 120 via the transducer 115.

The fluid flow sensor 120 is configured to monitor fluid flow of a fluid (e.g. water or natural gas) 125 within a pipe 124. The fluid flow sensor 120 illustratively includes a disc comprising a first ferromagnetic semicircle 121, and a plastic second semicircle 122. The fluid flow sensor 120 illustratively includes a plurality of coils 123a-123c, which is in fixed relation, but electrically insulated from the disc. When the fluid 125 flows, the disc rotates in linear relation (i.e. increased disc rotation indicates increased fluid flow). As the disc rotates, the rotating ferromagnetic semicircle 121 causes a time varying electromagnetic field in the plurality of coils 123a-123c, which causes an electrical response.

In this application, the plurality of coils 123a-123c serves as the inductor 116 in the transducer 115. Accordingly, when in the operational mode, the processing circuit 113 is configured to continuously monitor the transducer 115, i.e. monitoring electrical response in the transducer to detect flow of the fluid 125. When the flow of the fluid 125 stops, the processing circuit 113 detects this, and when a certain timeout period has elapsed without any detected flow, the processing circuit causes the electronic device 110 to enter the low power mode, which permits the electronic device to use less power.

The electronic device 110 may include a memory (not shown) coupled to the processing circuit 113. While in the operational mode, the processing circuit 113 may store detected fluid flow data in the memory. The memory may comprise a non-volatile memory, or a volatile memory permanently coupled to the battery power source 114.

Typical fluid flow sensors are powered continuously, regardless of whether the fluid is flowing. Basically, these typical fluid flow sensors always consume power, thereby increasing the maintenance cycle (i.e. more battery replacements). Advantageously, the electronic device 110 is in the operational mode only when the fluid 125 is flowing. When there are periods of fluid flow inactivity, the electronic device 110 enters a low power mode, and awakens only when fluid flow is detected via the electrical pulse 118. The electronic device 110 provides increased battery life and reduced maintenance over typical approaches. Also, since power consumption is reduced, the electronic device 110 could also use batteries with less capacity (i.e. a total battery capacitance) and provide similar battery life as compared to typical approaches with large battery capacities, which reduces costs.

Also, in this embodiment, the battery power source 114 is coupled to a backup power input of the processing circuit 113. This backup power enables the processing circuit 113 to maintain basic time keeping functionality while without main power from the power circuit 112.

Another aspect is directed to a sensor device 110. The sensor device 110 may include a fluid flow sensor 120 configured to generate an electrical output (i.e. a pulse) 118 responsive to a sensed fluid flow, a data storage element 111 configured to change state responsive to the fluid flow sensor, and a voltage regulator 112 configured to turn on and supply power responsive to the data storage element changing state. The sensor device 110 may also comprise a processing circuit 113 configured to be powered by the voltage regulator 112.

Figure 3:
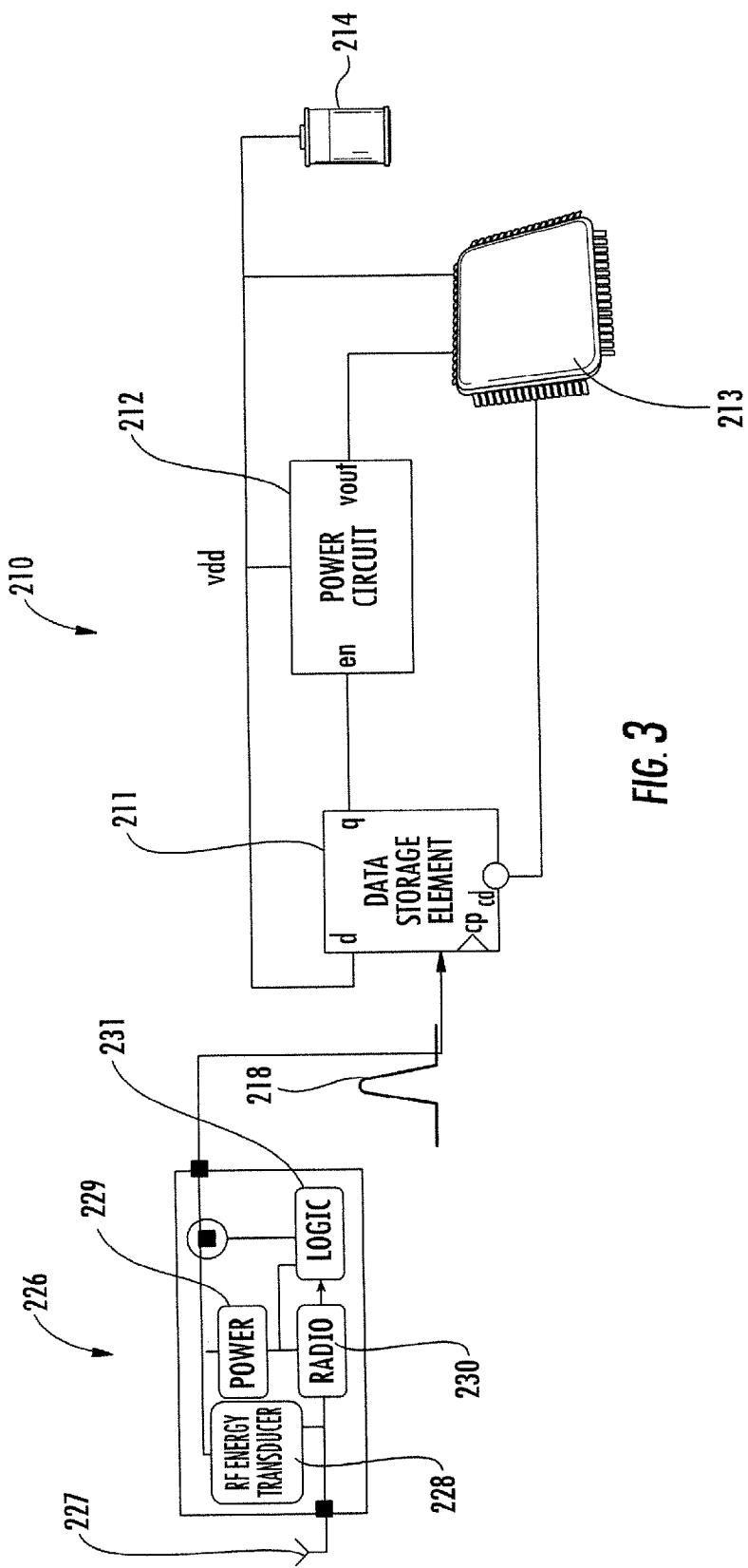
FIG. 3 is a schematic diagram of another embodiment of the electronic device, according to the present disclosure.

Referring now additionally to FIG. 3, another embodiment of the electronic device 210 is now described. In this embodiment of the electronic device 210, those elements already discussed above with respect to FIG. 1 are incremented by 200 and most require no further discussion herein. This embodiment differs from the previous embodiment in that this electronic device 210 illustratively includes a wireless receiver 226 coupled to the data storage element 211. The wireless receiver 226 illustratively includes an antenna 227 configured to receive a remote RF signal, an RF energy transducer 228 coupled to the antenna, a power circuit 229 coupled to the RF energy transducer, a radio receiver circuit 230 coupled to the antenna, and a logic circuit 231 coupled to the radio receiver circuit. The wireless receiver 226 is configured to generate the electrical pulse 218 based upon the received remote RF signals, and output the electrical pulse to the data storage element 211.

In other words, the wireless receiver 226 enables the electronic device 210 to be placed in the operational mode remotely. For example, in large network applications, such as when a large number of the sensor devices 110 of FIG. 2 are deployed to monitor sprawling fluid delivery infrastructure, each sensor device includes the wireless receiver 226, which enables the network of sensor devices to be enabled globally.

Figure 4:
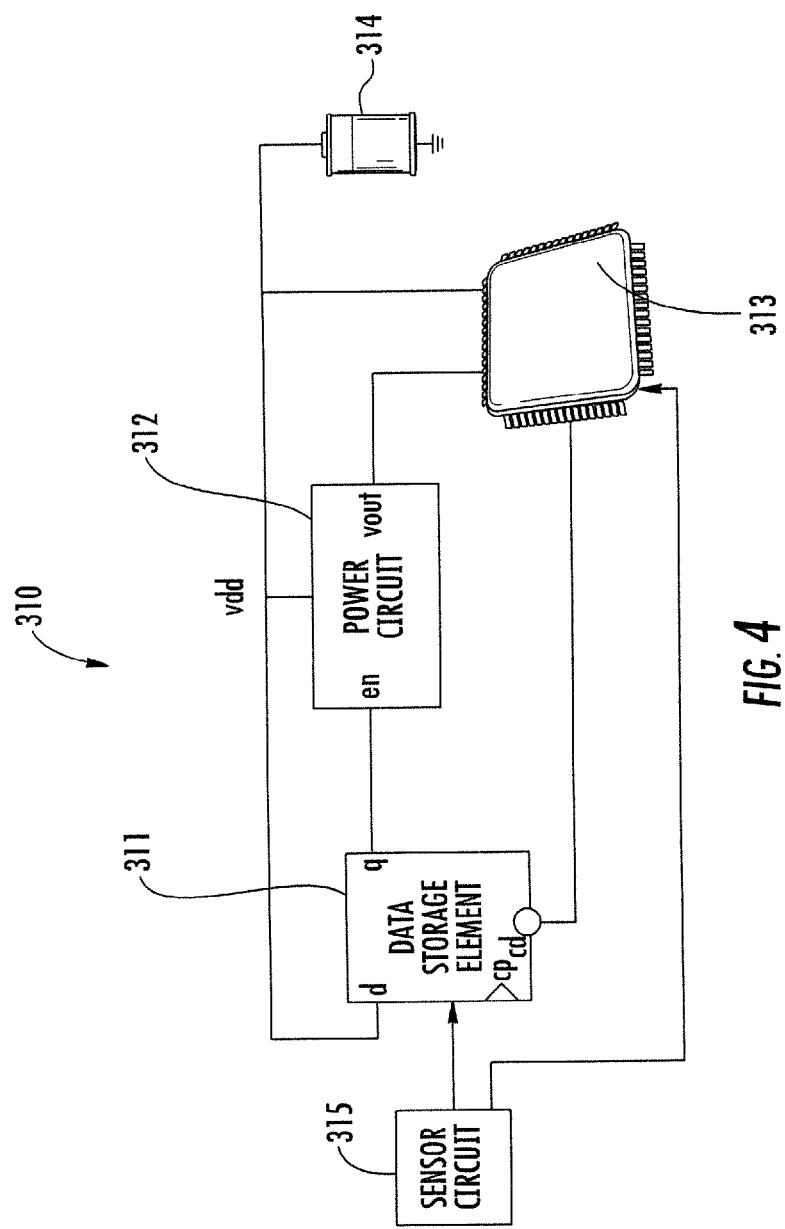
FIG. 4 is a schematic diagram of yet another embodiment of the electronic device, according to the present disclosure.

Referring now additionally to FIG. 4, another embodiment of the electronic device 310 is now described. In this embodiment of the electronic device 310, those elements already discussed above with respect to FIG. 1 are incremented by 300 and most require no further discussion herein. This embodiment differs from the previous embodiment in that this electronic device 310 illustratively includes a sensor circuit 315 serving as the transducer of the above embodiments and generating an electrical output responsive to a sensor input. For example, the sensor circuit 315 may comprise a piezoelectric sensor, an electroacoustic sensor, a thermoelectric transducer/generator/sensor, a gyroscope sensor, a motion detector sensor, a mechanical-to-electrical sensor, or a mechanical-to-electrical sensor.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

Other features relating to sensors/power circuits are disclosed in co-pending applications: titled "A METHOD OF INTERFACING A LC SENSOR AND RELATED SYSTEM," application Ser. No. 14/739,195, filed Jun. 15, 2015; and "A METHOD OF INTERFACING AN LC SENSOR AND RELATED SYSTEM," application Ser. No. 14/751,254, filed Jun. 26, 2015, all incorporated herein by reference in their entirety.

That which is claimed is:

1. An electronic device comprising:
    a transducer configured to generate, at an output terminal, an electrical output responsive to an input;
    a data storage element configured to change state responsive to a reception of said electrical output at a clock input of said data storage element;
    a power circuit configured to turn on and supply power responsive to said data storage element changing state; and
    a processing circuit configured to be powered by said power circuit and coupled to a control terminal of the data storage element and the output terminal of the transducer, wherein the processing circuit is configured to monitor the output terminal of the transducer when the processing circuit is powered, and wherein the processing circuit is configured to provide a control signal to the control terminal of the data storage element in response to a cessation of the electrical output at the output terminal of the transducer, the control signal being configured to clear an output of the data storage element.

2. The electronic device of claim 1 wherein said transducer is configured to generate the electrical output comprising an electrical pulse.

3. The electronic device of claim 2 wherein said power circuit is configured to turn on and supply power responsive to the electrical pulse.

4. The electronic device of claim 1 wherein said data storage element comprises a flip flop configured to receive the electrical output and a reference voltage.

5. The electronic device of claim 1 wherein said transducer comprises a mechanical-to-electrical transducer.

6. The electronic device of claim 1 wherein said transducer comprises an inductor-capacitor tank circuit.

7. The electronic device of claim 1 wherein said transducer comprises a mechanical-to-electrical sensor.

8. The electronic device of claim 1 further comprising a wireless receiver coupled to said data storage element; and wherein said wireless receiver is configured to generate an electrical pulse based upon received radio frequency signals, and output the electrical pulse to said data storage element.

9. A sensor device comprising:
    a fluid flow sensor configured to generate an electrical output at an output terminal of the fluid flow sensor responsive to a sensed fluid flow;
    a data storage element having a clock input coupled to an output of said fluid flow sensor, said data storage element being configured to change state in response to said electrical output being received at said clock input;
    a voltage regulator configured to turn on and supply power responsive to said data storage element changing state; and
    a processing circuit configured to be powered by said voltage regulator and coupled to a control terminal of the data storage element and the output terminal of the fluid flow sensor, wherein the processing circuit is configured to monitor the output terminal of the fluid flow sensor when the processing circuit is powered, and wherein the processing circuit is configured to provide a control signal to the control terminal of the data storage element in response to a cessation of the electrical output at the output terminal of the fluid flow sensor, the control signal being configured to clear an output of the data storage element.

10. The sensor device of claim 9 wherein said fluid flow sensor is configured to generate the electrical output comprising an electrical pulse.

11. The sensor device of claim 10 wherein said voltage regulator is configured to turn on and supply power responsive to the electrical pulse.

12. The sensor device of claim 9 wherein said data storage element comprises a flip flop configured to receive the electrical output and a reference voltage.

13. The sensor device of claim 9 further comprising a wireless receiver coupled to said data storage element; and wherein said wireless receiver is configured to generate an electrical pulse based upon received radio frequency signals, and output the electrical pulse to said data storage element.

14. A sensor device comprising:
    a sensor circuit configured to generate an electrical output at an output terminal of the sensor circuit responsive to an input;
    a data storage element configured to be clocked by said electrical output, said data storage element being further configured to change state responsive to said electrical output;
    a power circuit configured to turn on and supply power responsive to said data storage element changing state; and
    a processing circuit configured to be powered by said power circuit and coupled to a control terminal of the data storage element and the output terminal of the sensor circuit, wherein the processing circuit is configured to monitor the output terminal of the sensor circuit when the processing circuit is powered, and wherein the processing circuit is configured to provide a control signal to the control terminal of the data storage element in response to a cessation of the electrical output at the output terminal of the sensor circuit, the control signal being configured to clear an output of the data storage element.

15. The sensor device of claim 14 wherein said sensor circuit is configured to generate the electrical output comprising an electrical pulse.

16. The sensor device of claim 15 wherein said power circuit is configured to turn on and supply power responsive to the electrical pulse.

17. The sensor device of claim 14 wherein said data storage element comprises a flip flop configured to receive the electrical output and a reference voltage.

18. The sensor device of claim 14 wherein said sensor circuit comprises a mechanical-to-electrical sensor.

19. An electronic device coupled to a transducer generating an electrical output at an output terminal of the transducer responsive to an input, the electronic device comprising:
    a data storage element configured to output an enable signal in response to receiving said electrical output at a clock input of said data storage element;
    a power circuit configured to turn on and supply power responsive to said enable signal; and
    a processing circuit configured to be powered by said power circuit and coupled to a control terminal of the data storage element and the output terminal of the transducer, wherein the processing circuit is configured to monitor the output terminal of the transducer when the processing circuit is powered, and wherein the processing circuit is configured to provide a control signal to the control terminal of the data storage element in response to a cessation of the electrical output at the output terminal of the transducer, the control signal being configured to clear an output of the data storage element.

20. The electronic device of claim 19 wherein said data storage element comprises a flip flop configured to receive the electrical output and a reference voltage.

21. The electronic device of claim 19 further comprising a wireless receiver coupled to said data storage element; and wherein said wireless receiver is configured to generate an electrical pulse based upon received radio frequency signals, and output the electrical pulse to said data storage element.

22. A method for operating an electronic device comprising:
    operating a transducer to generate an electrical output at an output terminal of the transducer responsive to an input;
    triggering a clock input of a data storage element with said electrical output, the triggering configured to change a state of said data storage element;
    operating a power circuit to turn on and supply power responsive to the data storage element changing state; and
    operating a processing circuit to be powered by the power circuit and coupled to a control terminal of the data storage element and the output terminal of the transducer, wherein operating the processing circuit comprises:
        monitoring the output terminal of the transducer when the processing circuit is powered;
        providing a control signal to the control terminal of the data storage element in response to a cessation of the electrical output at the output terminal of the transducer; and
        clearing, in response to the control signal, an output of the data storage element.

23. The method of claim 22 wherein the transducer is configured to generate the electrical output comprising an electrical pulse.

24. The method of claim 23 wherein the power circuit is configured to turn on and supply power responsive to the electrical pulse.

25. The method of claim 22 wherein the data storage element comprises a flip flop configured to receive the electrical output and a reference voltage.

26. The method of claim 22 further comprising coupling a wireless receiver to the data storage element; and wherein the wireless receiver is configured to generate an electrical pulse based upon received radio frequency signals, and output the electrical pulse to the data storage element.

* * * * *